July 2, 1963 B. B. S. T. BOONSTRA 3,096,210
INSULATED CONDUCTORS AND METHOD OF MAKING SAME
Filed April 17, 1959
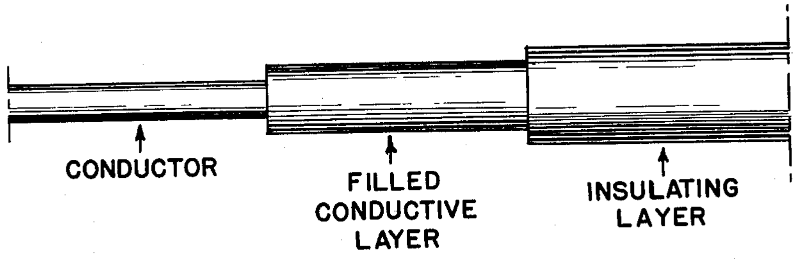
INVENTOR.
BRAM B. S. T. BOONSTRA
BY Kenneth W. Brown, Atty United States Patent Office 3,096,210

Patented July 2, 1963

3,096,210

INSULATED CONDUCTORS AND METHOD OF MAKING SAME

Bram B. S. T. Boonstra, Sharon, Mass., assignor to Cabot Corporation, Boston, Mass., a corporation of Delaware Filed Apr. 17, 1959, Ser. No. 807,001

15 Claims. (Cl. 117—216)

This application relates generally to conductors and the like and in particular to improved conductors for high voltage use.

The phenomenon of "Corona," the discharge of electricity which appears on irregularities on the surface of a conductor under high voltage, is reduced or eliminated when the conductor is securely and tightly covered by a smooth relatively highly conductive sheathing. Accordingly, cables and the like for high voltage use are presently usually covered by a conductive sheathing of some type, the conductive sheathing being in turn covered by a protective insulating sheathing.

Heretofore, the conductive sheathing over the cable has usually consisted of a highly conductive "lapping" or winding produced by treating or impregnating a suitable material such as cloth or tape with a conductive material, such as carbon black, for example as is disclosed in the U.S. Patent No. 2,416,892 to Barnard et al. This conductive lapping is in turn usually covered by an extruded insulating sheathing, for example, of polyvinyl chloride or rubbers, such as GR–S. The sheathing of the conductive lapping or winding by an insulating sheathing, however, involves a somewhat difficult and expensive operation because care has to be taken that substantially no pockets of air are trapped between the conductive sheathing and the insulating sheathing. Air pockets, if trapped therebetween, under certain conditions foster the phenomenon of "Corona" with concomitant losses of power and eventual breakdown of the conductive and insulating sheathings.

An additional problem in the prior art is the difficulty of thoroughly and completely bonding the outer insulating sheathing to the inner conductive sheathing. Such a bond is highly desirable because such a bond minimizes the possibility of pockets of air becoming entrapped between the conductive and insulating sheathings.

In the present invention the problems inherent in the prior art have been largely resolved or circumvented. The present invention provides for conductive compositions which exhibit properties superior to those of prior art conductive sheathings and which lend themselves more easily to utilization as conductive sheathings than do prior art lappings and the like. Also, the present invention accomplishes the thorough bonding of the conductive and insulating sheathings.

Accordingly, it is a principal object of the present invention to provide improved conductors and the like for high voltage use.

Another object of the present invention is to provide an improved conductive composition suitable for use as a sheathing for high voltage conductors and the like.

Another object of this invention is to provide a conductive composition which can be more easily than heretofore applied to a conductor as a sheathing.

Still another object of this invention is to provide a conductive composition which can be directly applied to a conductor by extrusion.

Still another object of this invention is to provide a conductor having immediately superimposed thereon a conductive sheathing to which there is chemically bonded an insulating sheathing.

Other objects of this invention will in part be obvious and will in part appear hereinafter.

In accordance with the present invention, it was discovered that certain compositions comprising a polymeric material and carbon black are excellent conductors and possess properties well suited to use as a conductive sheathing for cables and the like intended for high voltage use. Moreover, it was discovered that such a composition prior to curing lends itself well to being applied to a conductor by extrusion or casting from solution. Application of the sheathing to the conductor by casting from solution or directly by extrusion is most desirable since either of these methods of application not only is less laborious than lapping but also provides a conductive sheathing having a very smooth surface, thereby substantially decreasing the difficulties involved in superimposing an insulating sheathing without entrapping pockets of air between the insulating and the conductive sheathings.

The protective insulating sheathing which is usually applied over the conductive sheathing may consist of any of the well-known protective insulating materials and may be applied in any well-known manner, preferably by extrusion.

Suitable polymeric materials for the purposes of the present invention are the polymers and copolymers of the simple mono-olefinic hydrocarbons and mixtures thereof such as polyethylene, polybutene and copolymers thereof.

The drawing illustrates the conductor substrate with the filled conductive layer and the insulating outer layer.

The quantity of carbon black present in the compositions of the present invention is somewhat critical in that the ultimate conductivity of the composition is largely dependent upon the quantity and type of carbon black contained therein. Accordingly, there must be sufficient carbon black present to produce a composition having a D.C. resistivity at room temperature of less than about 50,000 ohms-cm. and preferably less than about 10,000 ohms-cm. The quantity of carbon black required to produce the required conductivity depends largely upon the type of carbon black utilized. For example, if a conductive carbon black such as Vulcan XC–72, which is produced by Cabot Carbon Company and has a dry resistivity value of about 0.27 ohm-cm. at a density of 0.54 gm./cc. is utilized, only about 20 parts by weight of carbon black per 100 parts of the polymeric material are required to give a resistivity value of about 10,000 ohms-cm. If, however, a channel carbon black such as "Spheron 9," a channel black having a dry resistivity value of about 10 ohms-cm. at a density of 0.52 gm./cc. produced by Cabot Carbon Company is utilized, about 225 parts are required to give equivalent low resistivity. Other blacks are generally intermediate between these two, the minimum adequate loading lying somewhere between 20 and 250 parts. However, it can in general be stated that at least 20 parts by weight of carbon black per 100 parts of polymer are required, and preferably for most purposes not less than 25 parts will be used.

The manner in which the compositions of the present invention are cured is not critical. Curing by irradition, for example, is well suited to the curing of compositions extruded or cast upon conductors. Definitely preferred, however, is curing by chemical means. As is well known, chemical curing is accomplished by incorporating a small portion, that is from about 0.1 to about 10% by weight, of a suitable chemical curing agent into the composition to be cured. Curing is subsequently accomplised merely by heating the composition to curing temperatures.

The specific curing agents utilized in the present invention are not in themselves critical. Obviously the activation temperature of the specific curing agent utilized in a given composition must be above the minimum milling and/or extrusion temperature of the composition. However, in general any of the curing agents which are suitable for curing polymeric materials of the type mentioned above are in general useful as curing agents for the purposes of the present invention. For example, organic peroxides which contain the hydrogen peroxy group (O—O—H) or in which both oxygen atoms of the peroxy group (O—O—) are joined to organic radicals are suitable for the purposes of the present invention. The organic radicals in these peroxides may be selected from the class consisting of alkyl, cycloalkyl, aryl, aralkyl, acyl, alkenyl, cycloalkenyl, and any such groups bearing substituent groups which do not render the peroxide dangerously unstable or so excessively stable that it will not decompose upon the application of that amount of heat which can safely be tolerated by the polymer. For example, alkyl, cycloalkyl, aryl, aralkyl, halogen, hydroxyl, alkoxy, aryloxy, carboxy, nitro and peroxy groups are all generally suitable substituents, at least individually.

Also suitable for use as curing agents in the process of the present invention are the quinone oximes and the quinone oxime derivatives disclosed in copending U.S. patent applications Nos. 767,756 and 767,776 of Donald B. Smith and James C. MacKenzie, filed October 17, 1958.

The conductive compositions of the present invention are well suited to being applied to a conductor as sheathings by extrusion or casting. A suitable process for casting from solution is fully disclosed in the pending U.S. patent application of Williams et al., S.N. 785,129, filed January 6, 1959.

Application of the conductive sheathing to the conductor by extrusion can be accomplished by conventional apparatus such as by a plastic or rubber extruder utilizing well-known techniques. The conductors to be sheathed according to the present invention are of course not critical. Any of the well-known conductors such as single and multi strand wires, of aluminum, aluminum coated steel, copper, copper coated steel, steel, tin coated copper, or other materials, are perfectly suitable for the purposes of the present invention.

There follow a number of non-limiting illustrative examples:

*Example 1*

A composition comprising 100 parts by weight of "Alathon 10," a low density polyethylene produced by E. I. du Pont de Nemours & Company and having yield and tensile strengths of 1700 lbs./in.$^2$ and 1750 lbs./in.$^2$ respectively, 300 parts of medium thermal carbon black and 4 parts of dicumyl peroxide is extruded as a 1/16 inch sheathing at a temperature of about 125° C. upon No. 8 solid copper wire by means of a screw extruder. This conductive sheathing is then cured by being heated in an autoclave to a temperature of about 175° C. for about 5–6 minutes. A protective insulating sheathing of polyethylene is then superimposed on the conductive sheathing by extrusion. A sample of the cured conductive sheathing is found to have yield and tensile strengths of about 3950 lbs./in.$^2$ and a D.C. resistivity at room temperature as measured by the "National Bureau of Standards" (NBS) Electrical Resistivity Test of about 19 ohms-cm.

*Example 2*

A composition comprising 100 parts by weight of a low density polyethylene, 40 parts by weight of Vulcan XC–72 and 2 parts of dicumyl peroxide is extruded at a temperature of about 135° C. on No. 6 steel wire by means of a cross head extruder. A sample of the cured composition was found to have yield and tensile strengths of about 2400 lbs./in.$^2$ and a D.C. resistivity at room temperature as measured by the above mentioned NBS test of about 40 ohms-cm.

*Example 3*

A composition comprising 100 parts of "Super Dylan 6200," a high density polyethylene polymer produced by Koppers Company, Inc., having a density of 0.96, 40 parts of Vulcan XC–72 and 2 parts of dicumyl peroxide was milled in a Banbury mixer until a substantially homogeneous composition was obtained. 40 grams of this composition were then dissolved in 175 grams of xylene. A piece of solid copper wire was then dipped into this solution and subsequently dried at a temperature of about 165° C. until all the xylene had been evaporated off. The coated or sheathed wire was then cured at about 175° C. for 10 minutes. A sample of the cured composition was found to be 74% insoluble after immersion in xylene for 24 hours at 110° C. The resistivity of the cured composition as measured by the NBS test was found to be about 17 ohms-cm.

In a preferred embodiment of this invention, the protective insulating sheathing which is applied over the conductive sheathing comprises a polymeric material as defined above which is chemically bound to the conductive sheathing. In this embodiment of the invention, the curable conductive composition is first applied to the conductor as a sheathing. This conductive sheathing is not, however, then immediately cured. Instead, a protective insulating sheathing is first superimposed on the curable conductive sheathing preferably by being extruded or cast thereon.

Subsequently, the composite sheathings are heated to the temperatures at which the curing agent contained in the conductive sheathing promotes curing. Since a portion of said curing agent is present on the surface of the conductive sheathing which is in contact with the insulating sheathing, the surfaces of the conductive and insulating sheathings become chemically bound to each other.

Of course, if desired a curing agent can also be incorporated into the insulating sheathing as well as into the conductive sheathing. This alternative is usually unnecessary, but under certain conditions does produce a stronger bond between the two sheathings.

In addition to a curing agent, the insulating sheathing may also contain other additives normally added to polymeric materials of this type such as fillers and antioxidants.

There follow a number of non-limiting illustrative examples:

*Example 4*

The composition of Example 1 is extruded upon solid copper wire as set forth in that example. An insulating sheathing comprising polyethylene is then extruded at a temperature of about 125° C. by means of a screw extruder upon the conductive sheathing. The wire with the superimposed sheathings is then heated to 175° C. for about 5–10 minutes. A sample of the cured conductive composition is found to have yield and tensile strengths of about 3950 lbs./in.$^2$ and a D.C. resistivity at room temperature as measured by the NBS test of about 19 ohms-cm. The insulating sheathing is found to have a D.C. resistivity at room temperature of about $10^{17}$ ohms-cm. The bond between the conductive and insulating sheathings is found to be so strong, that when sufficient force is exerted either the conductive or insulating sheathing ruptures, leaving the bond between the sheathings substantially unaffected.

*Example 5*

In this example the conductive composition of Example 3 is extruded as set forth in Example 3 upon a wire at a temperature of about 130° C. Subsequently a composition comprising 100 parts of "Alathon 10," 5 parts of "Sterling S," a relatively non-conducting gas furnace carbon black having a dry resistivity value of about 40 ohms-cm. at a density of 0.54 gm./cc. produced by Cabot Carbon Company, and 3 parts of dicumyl peroxide is extruded over the conductive sheathing at a temperature of about 125° C. by means of an offset head extruder. The conductive and insulating sheathings are then cured and a bond between the two sheathings formed by heating in a steam tube to a temperature of about 175° C. for 5–6 minutes. The properties of the finished product are comparable to the properties of the product of Example 4 except that the insulating layer, after extraction in xylene at 80° C. for about 24 hours is found to be about 80% insoluble and to have a very high D.C. resistivity at room temperature.

In another embodiment of this invention, curing of the conductive sheathing and establishment of the bond between the sheathings are accomplished simultaneously with the extrusion of the insulating sheathing. This is achieved by carrying out the extrusion of the insulating sheathing at temperatures that are sufficiently high to cause substantially complete curing of the conductive sheathing and formation of the bond between the conductive and insulating sheathings. Accordingly, in this embodiment of the invention, the insulating sheathing must be extruded upon the conductive sheathing at temperatures at least as high as the activation temperature of the curing agent and preferably at temperatures at least 25° C. higher than the activation temperature of the curing agent.

There follows an illustrative example:

*Example 6*

This example is a duplicate of Example 4 except that the extrusion of the insulating sheathing over the conductive sheathing is accomplished at a temperature of about 215° C. Since the extrusion temperature is substantially higher than the decomposition temperature of the curing agent, dicumyl peroxide, present in the conductive sheathing, curing of the conductive sheathing and formation of the chemical bond between the conducting and insulating sheathings proceed as the insulating sheathing is extruded and comes into contact with the conductive sheathing. The properties of the product of this example are substantially identical with the properties of the product of Example 4.

It should be pointed out that considerable difficulty was encountered in incorporating large quantities, that is above about 50 parts by weight of very fine highly conductive blacks into the polymeric materials. However, in accordance with the present invention, it was additionally discovered that if a polymeric material were filled with a blend of conductive carbon black and ordinary carbon black, total loadings of as high as 125 parts or more were obtainable and that compositions containing these blends exhibited very high conductivities.

An illustrative example follows:

*Example 7*

100 parts of "Alathon 10," 80 parts of medium thermal carbon black, 20 parts of Vulcan XC–72, and 1.7 parts of dicumyl peroxide were milled in a Banbury mixer until a substantially homogeneous composition was obtained. 40 grams of the granulated composition was then dissolved in 175 grams of toluene at 135° C. A piece of copper cable having a diameter of 2 mm. was dipped into the solution. The sheathed cable was then dried at a temperature of about 135° C. until all the toluene had been evaporated off. The sheathed cable was then cured at 175° C. for about 10 minutes and was found to be about 80% insoluble after immersion in xylene for 24 hours at about 80° C. The resistivity of the sheathing as measured by the NBS test was about 1000 ohms-cm.

It was additionally discovered in accordance with the present invention that a chemical bond between the conductive sheathing and the insulating sheathing can be produced even after the curing of the conductive sheathing has taken place. In this embodiment of the invention, the conductive sheathing is extruded upon the conductor and cured. Subsequently the insulating sheathing comprising a polymeric material, as defined above, and a curing agent is extruded over the cured conductive sheathing. Thereafter the insulated conductor is heated to curing temperatures thereby curing the insulating layer and establishing a chemical bond between the insulating layer and the conductive layer.

An illustrative example follows:

*Example 8*

The composition of Example 1 is extruded upon solid copper wire and subsequently cured as set forth in that example. An insulating sheathing comprising polyethylene and 3 parts of dicumyl peroxide is extruded at a temperature of 125° C. by means of a screw extruder upon the conductive sheathing. The insulated wire is then heated to 175° C. for 10 minutes. A strong bond is formed between the conductive and insulating sheathings.

Obviously, many changes can be made in the above procedure and materials without departing from the scope of the invention. For example, although only small amounts of carbon black were specifically disclosed above as being a suitable filler for the insulating sheathing, other fillers which do not substantially decrease the resistivity of the insulating layer, such as wood flour, clays, or whiting are suitable for the purposes of the present invention.

Also, if it is unnecessary or undesirable that either the conductive or insulating sheathings be cured but a bond between the sheathings is nevertheless desired such a bond can be achieved by first applying the conductive sheathing to the conductor, and applying to the surface of the conductive sheathing a curing agent, for example, in paste or solution form. Subsequently the insulating layer is applied over the conductive layer. The insulated conductor is then heated to the activation temperature of the curing agent and a bond between the conductive and insulating sheathings is formed.

Accordingly, it is intended that the above disclosure be regarded as illustrative and as in no way limiting the scope of the invention.

What I claim is:

1. An insulated conductor for high voltage use which comprises a conductor, a cured conductive sheathing surrounding said conductor and an outer insulating sheathing, said conductive and insulating sheathings being chemically bonded to each other, said conductive sheathing comprising a crosslinked polymeric material chosen from the group consisting of the polymers and copolymers of the mono-olefinic hydrocarbons and mixtures thereof, and at least about 20 parts by weight of carbon black per 100 parts of the polymeric material, and said insulating sheathing comprising a polymeric material chosen from the group consisting of the polymers and copolymers of the mono-olefinic hydrocarbons and mixtures thereof.

2. The insulated conductor of claim 1 wherein said crosslinked polymeric material contained in said conductive sheathing comprises polyethylene.

3. The insulated conductor of claim 1 wherein said insulating sheathing comprises polyethylene.

4. The insulated conductor of claim 1 wherein said carbon black in said conductive sheathing comprises conductive carbon black.

5. The insulated conductor of claim 1 wherein said conductive sheathing comprises up to about 125 parts by weight of a mixture of conductive carbon black and ordinary carbon black per 100 parts by weight of said polymeric material.

6. A process for producing an insulated conductor for high voltage use having conductive and insulating sheathings chemically bonded to each other which comprises applying to a conductor a heat curable conductive sheathing comprising polyethylene, at least about 20 parts by weight of carbon black per 100 parts of polyethylene and a minor portion of a curing agent, heating said conductive sheathing to curing temperatures, and subsequently applying an insulating sheathing comprising polyethylene over the cured conductive sheathing.

7. The process of claim 6 wherein said conductive sheathing comprises high density polyethylene, at least about 20 parts by weight of carbon black per 100 parts of said polyethylene and a minor portion of a curing agent.

8. The process of claim 6 wherein said insulating sheathing comprises polyethylene and a curing agent and wherein subsequent to the application of said insulating sheathing over said conductive sheathing, the insulated conductor is heated to curing temperatures.

9. A process for producing an insulated conductor for high voltage use having conductive and insulating sheathings chemically bonded to each other which comprises extruding upon a conductor a heat curable conductive sheathing comprising a polymeric material chosen from the group consisting of the polymers and copolymers of the mono-olefinic hydrocarbons and mixtures thereof, at least about 20 parts by weight of carbon black per 100 parts of said polymeric material and a minor portion of a curing agent, said extrusion being conducted at temperatures below the activation temperature of said curing agent, subsequently superimposing over said conductive sheathing an insulating sheathing comprising a polymeric material chosen from the group consisting of the polymers and copolymers of the mono-olefinic hydrocarbons and mixtures thereof, and heating the insulated conductor to curing temperatures.

10. The process of claim 9 wherein said polymeric material contained in said conductive sheathing comprises high density polyethylene.

11. A process for producing an insulated conductor for high voltage use which comprises extruding upon a conductor a heat curable conductive sheathing comprising a polymeric material chosen from the group consisting of the polymers and copolymers of the mono-olefinic hydrocarbons and mixtures thereof, at least about 20 parts by weight of carbon black per 100 parts of said polymeric material and a minor portion of a curing agent, curing said conductive sheathing by heating to curing temperatures, and subsequently superimposing an insulating sheathing over said conductive sheathing.

12. A process for producing an insulated conductor for high voltage use having conductive and outer insulating sheathings chemically bonded to each other which comprises extruding upon a conductor a heat curable conductive sheathing comprising a polymeric material chosen from the group consisting of the polymers and copolymers of the mono-olefinic hydrocarbons and mixtures thereof, at least 20 parts by weight of carbon black per 100 parts of said polymeric material and a minor portion of a curing agent, curing said conductive sheathing by heating to curing temperatures, subsequently superimposing an insulating sheathing over said conductive sheathing, said insulating sheathing comprising a polymeric material chosen from the group consisting of the polymers and copolymers of the mono-olefinic hydrocarbons and mixtures thereof and a minor portion of a curing agent and heating said insulated conductor to curing temperatures.

13. The process of claim 12 wherein said insulating sheathing comprises a polymeric material chosen from the group consisting of the polymers and copolymers of the mono-olefinic hydrocarbons and mixtures thereof, a filler and a minor portion of a curing agent.

14. A process for producing an insulated conductor for high voltage use having conductive and insulating sheathings chemically bonded to each other which comprises, extruding upon a conductor at temperatures below the activation temperature of the curing agent, a heat curable conductive sheathing comprising a polymeric material chosen from the group consisting of the polymers and copolymers of the mono-olefinic hydrocarbons and mixtures thereof, at least about 20 parts by weight of carbon black per 100 parts of the polymeric material, and a curing agent, subsequently extruding upon said conductive sheathing at a temperature at least as high as the activation temperature of said curing agent, an insulating sheathing comprising a polymeric material chosen from the group consisting of the polymers and copolymers of the mono-olefinic hydrocarbons and mixtures thereof.

15. The process of claim 14 wherein said polymeric material in said conductive sheathing comprises high density polyethylene.

References Cited in the file of this patent

UNITED STATES PATENTS

| | | |
|---|---|---|
| 2,480,298 | Happoldt | Aug. 30, 1949 |
| 2,528,523 | Kent | Nov. 7, 1950 |
| 2,708,215 | Kaganoff | May 10, 1955 |
| 2,717,216 | Arone | Sept. 6, 1955 |
| 2,830,919 | Schatzel | Apr. 15, 1958 |
| 2,930,083 | Vostovich et al. | Mar. 29, 1960 |